United States Patent
Francavilla et al.

(10) Patent No.: US 8,226,319 B2
(45) Date of Patent: *Jul. 24, 2012

(54) FLUID DISPENSER ASSEMBLY

(75) Inventors: Frank Francavilla, Wantage, NJ (US); Kevin F. X. Kearsey, Monsey, NY (US)

(73) Assignee: Lucas Publications, Inc., Wantage, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/901,656

(22) Filed: Oct. 11, 2010

(65) Prior Publication Data

US 2011/0027005 A1    Feb. 3, 2011

Related U.S. Application Data

(63) Continuation of application No. 12/231,742, filed on Sep. 5, 2008, now Pat. No. 7,824,124, which is a continuation of application No. 10/792,036, filed on Mar. 3, 2004, now Pat. No. 7,467,908, which is a continuation-in-part of application No. 29/196,339, filed on Dec. 24, 2003, now Pat. No. Des. 529,817.

(51) Int. Cl.
*A47L 13/22* (2006.01)
*B67D 7/58* (2010.01)

(52) U.S. Cl. .................... 401/278; 222/383.1; 222/546; 222/325

(58) Field of Classification Search .................. 401/278, 401/170, 186, 188; 222/383.1, 546, 325, 222/389

See application file for complete search history.

(56) References Cited

U.S. PATENT DOCUMENTS

| | | |
|---|---|---|
| D158,554 S | 5/1950 | Cady |
| 2,637,466 A | 5/1953 | Wright |
| D175,548 S | 9/1955 | Kane |
| 3,091,374 A | 5/1963 | Schwartzman |
| 3,236,418 A | 2/1966 | Dalle et al. |
| 3,359,992 A | 12/1967 | Cishek et al. |
| 4,548,524 A | 10/1985 | Seager |
| 4,671,432 A | 6/1987 | Benecke et al. |
| 4,676,408 A | 6/1987 | Speitel |
| 4,685,820 A | 8/1987 | Kremer et al. |
| 4,722,459 A | 2/1988 | Goncalves |
| 4,783,185 A | 11/1988 | Erismann et al. |
| 4,787,911 A | 11/1988 | Sebag et al. |
| D299,973 S | 2/1989 | Campello et al. |
| D300,561 S | 4/1989 | Asa et al. |

(Continued)

FOREIGN PATENT DOCUMENTS

DE    39 37 295    5/1991

(Continued)

*Primary Examiner* — Kevin P Shaver
*Assistant Examiner* — Melvin Cartagena
(74) *Attorney, Agent, or Firm* — Lerner, David, Littenberg, Krumholz & Mentlik, LLP

(57) ABSTRACT

The present invention is directed toward a cost effective instrument for storing a fluid material, and applying a predetermined amount of the fluid material to a surface. The instrument is comprised of few parts including an outer casing and a fluid insert, making the instrument cheaper to manufacture, and easy to assemble. The embodiments disclosed can be provided in a pre-assembled form to cosmetic companies and the like seeking to fill a dispenser with their fluid cosmetic products. The ability to provide dispensers in a pre-assembled form, combined with the compatibility of the fluid dispensers with industrial high speed filling machines, reduces the overall filling costs to the cosmetic company, as well as the cost to the consumer.

12 Claims, 8 Drawing Sheets

U.S. PATENT DOCUMENTS

| | | | |
|---|---|---|---|
| 4,874,117 A | 10/1989 | Kay et al. | |
| 4,883,204 A | 11/1989 | Kay et al. | |
| D306,354 S | 2/1990 | Konose | |
| D306,355 S | 2/1990 | Shinohara | |
| D306,914 S | 3/1990 | Shinohara | |
| 4,981,241 A | 1/1991 | Keller | |
| 4,991,749 A | 2/1991 | Kay et al. | |
| 4,995,540 A | 2/1991 | Colin et al. | |
| D318,538 S | 7/1991 | Shinohara | |
| D325,264 S | 4/1992 | Shinohara | |
| 5,137,388 A * | 8/1992 | Kimura | 401/278 |
| D337,259 S | 7/1993 | Curtis et al. | |
| 5,295,601 A | 3/1994 | Bostelman | |
| 5,411,176 A | 5/1995 | Favre | |
| 5,423,752 A | 6/1995 | Haber et al. | |
| D364,003 S | 11/1995 | Benson | |
| D369,384 S | 4/1996 | Yasoshima | |
| 5,507,401 A | 4/1996 | Huang | |
| 5,526,960 A | 6/1996 | Breidenbach et al. | |
| 5,586,694 A | 12/1996 | Breidenbach et al. | |
| 5,819,988 A | 10/1998 | Sawhney et al. | |
| 5,851,080 A | 12/1998 | Nakajima et al. | |
| 5,938,363 A | 8/1999 | Timms | |
| 5,997,206 A | 12/1999 | Lin | |
| 6,016,916 A | 1/2000 | Ortner | |
| 6,176,396 B1 | 1/2001 | Hamada et al. | |
| 6,213,661 B1 | 4/2001 | Coon | |
| 6,234,181 B1 | 5/2001 | Lou | |
| 6,308,862 B1 | 10/2001 | Fillmore et al. | |
| 6,412,659 B1 | 7/2002 | Kneer | |
| 6,419,124 B1 | 7/2002 | Hennemann et al. | |
| 6,439,431 B1 | 8/2002 | Breault et al. | |
| 6,446,841 B1 | 9/2002 | Petit | |
| 6,505,983 B1 | 1/2003 | Seo | |
| 6,530,709 B1 | 3/2003 | Washington | |
| 6,533,482 B1 | 3/2003 | Byun | |
| 6,554,520 B2 | 4/2003 | Tsuchiya et al. | |
| 6,564,972 B2 | 5/2003 | Sawhney et al. | |
| 6,592,282 B2 | 7/2003 | Fontanet et al. | |
| 6,640,999 B2 | 11/2003 | Peterson | |
| D523,396 S | 6/2006 | Shiraishi et al. | |
| 7,467,908 B2 * | 12/2008 | Francavilla et al. | 401/278 |
| 2002/0040720 A1 | 4/2002 | Byun | |
| 2002/0074357 A1 | 6/2002 | Karr et al. | |
| 2003/0060925 A1 | 3/2003 | Bartholomew et al. | |
| 2003/0062379 A1 | 4/2003 | Bartholomew et al. | |
| 2003/0071076 A1 | 4/2003 | Tenzer | |
| 2003/0102329 A1 | 6/2003 | Ki | |
| 2003/0121940 A1 | 7/2003 | Ichikawa | |
| 2003/0123921 A1 | 7/2003 | Abbas | |

FOREIGN PATENT DOCUMENTS

| | | |
|---|---|---|
| GB | 2083142 | 9/1981 |
| WO | 01/87641 | 11/2001 |

\* cited by examiner

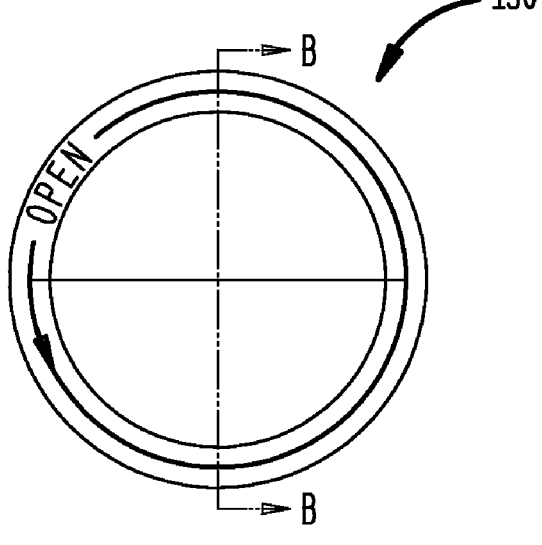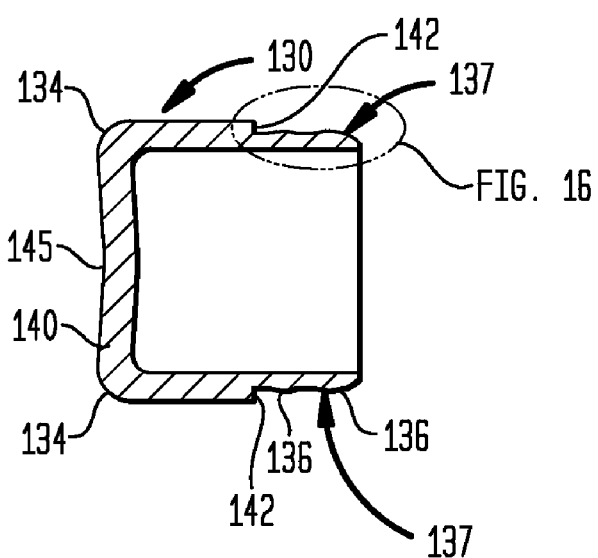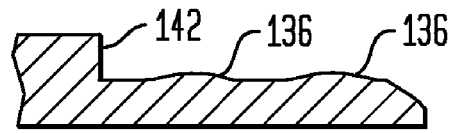

FLUID DISPENSER ASSEMBLY

CROSS-REFERENCE TO RELATED APPLICATIONS

The present application is a continuation of U.S. patent application Ser. No. 12/231,742, filed on Sep. 5, 2008, which application is a continuation of U.S. patent application Ser. No. 10/792,036, filed on Mar. 3, 2004, which application is a continuation-in-part of U.S. application Ser. No. 29/196,339, filed on Dec. 24, 2003, the disclosures of which are incorporated herein by reference.

BACKGROUND OF THE INVENTION

The present invention relates generally to a fluid dispenser, and more particularly to a cost-effective dispenser assembly that is fully compatible with high-speed in-line filling apparatuses, capable of dispensing predetermined amounts of fluid materials, and has few components to assemble.

Various types of dispensers for fluids are well known in the art. Dispensers typically comprise a cartridge for holding the fluid material, as well as a spray, pump, or plunger to dispense the fluid material out of the cartridge. Some dispensers have a spray pump attached to a pump line that runs through a cartridge containing fluid material, such as perfume. When the user depresses the spray pump, fluid material flows through the line to the spray, and then onto the desired medium. Other dispensers, such as those used for caulking, have a cartridge filled with caulk, and a trigger mechanism which causes a plunger in the cartridge to push the caulk out of the cartridge.

The shortcomings associated with these prior art dispensers concern their manufacture and assembly. Known dispensers typically require several pieces that must be manufactured and then assembled together. Some of the pieces, such as a separate applicator tip, are relatively small in size and can prove difficult to assemble. Known dispensers often have parts that need to be screwed together, or require additional adhesives or the like to secure the various components of the dispenser together. The configuration of known dispensers therefore requires extraneous parts and steps to complete the dispenser assembly process, which, in turn, drives up the costs for the manufacturer. These drawbacks are further compounded by the problems associated with filling known dispensers with fluid materials.

Once a dispenser has been manufactured, dispenser manufacturers typically solicit their dispensers to companies desiring to sell fluid products. For example, a cosmetic company may wish to purchase a dispenser designed to dispense a fluid lipstick, lotion, or the like. After purchasing the empty dispensers from a dispenser manufacturer, the cosmetic company will then proceed to fill the dispensers with its own product using a filling apparatus and process. There are many problems, however, associated with the purchase and subsequent filling of known dispensers by a purchasing company.

It is not cost-effective to fill known dispensers with fluid product using standard high-speed filling apparatuses and processes. Such dispensers often vary in shape and size and are not readily adaptable to preexisting high speed filling machines utilized by a particular company. For example, the shape of the dispenser body may not be compatible with the parts of the preexisting filling machine used to hold the dispenser during the filling process, or the opening of the cartridge may not be large enough (or even too small) to receive the nozzle of the filling apparatus that dispenses the fluid material from the filling apparatus to the cartridge. To remedy these problems, the cosmetic company is therefore forced to purchase new filling machines, and/or adapters, such as funnels, or custom made holders for the dispenser, commonly referred to as pucks, to make pre-existing filling machines and dispensers compatible with one another. In some situations, it is too costly to adapt a preexisting filling machine to fit a particular dispenser, which results in the inability to use such a dispenser in a high speed filling process, or similar type of filling process. This often forces the cosmetic company to either select an alternative dispenser, or to use an alternative slower process. Each of these problems is a costly venture for a purchasing company, who then passes the additional cost on to the consumer.

There are also additional costs associated with assembling the dispenser once the dispenser has been filled with the desired fluid material. In the filling process, typically a separate cartridge must first be filled by the filling apparatus, and then inserted into the dispensing device. Thereafter, the dispenser must be completely assembled and sealed. This task proves to be especially cumbersome when the dispenser has several components that need to be assembled after the filling process is completed. The added steps and time needed to assemble and fill such dispensers, slows down the filling process and drives up the filling costs. It also compromises the quality and integrity of the fluid material sitting in the dispenser because it leaves the fluid materials subject to contamination by dust, air, etc., until the dispenser is sealed.

These problems are evident in U.S. Application No. 2003/0123921 to Abbas ("Abbas"), which is directed toward an instrument preferably for applying a fluid material of low viscosity to a surface. FIG. 19 discloses a fluid dispenser that comprises a cartridge of fluid, a holder, an applicator tip, a pump and pump housing, and a retaining ring for holding the pump housing within the holder. Force applied to the cartridge causes fluid in the cartridge to flow from the pump to the holder, and the applicator tip. FIG. 23 of Abbas discloses a toothbrush dispenser preferably for dispensing a fluid of low viscosity, such as a liquid cleaner, mouthwash or perfume, onto teeth. The toothbrush dispenser comprises a cartridge of liquid cleaner having a pump, an outer holder for the cartridge, an applicator tip or toothbrush head attached to the holder, and a feeder line from the cartridge to the applicator tip. FIG. 27 shows a configuration similar to FIG. 23, the primary differences being that the applicator tip is a pad, and that instead of a feeder line from the inner cartridge to the applicator tip, there is an inking region that collects fluid material dispensed from the cartridge, and then dispenses the fluid material to the applicator tip. In both FIGS. 23 and 27, force applied to the cartridge causes fluid material from the cartridge to flow into either the feeder line or inking region, and then to the applicator tip. Despite the seemingly relative simplicity of these embodiments, there are still costly drawbacks associated with the manufacture of the Abbas dispensers, and the subsequent filling of the Abbas dispensers with fluid materials.

The Abbas dispenser is comprised of several parts that require assembly. The applicator tip must be inserted and secured onto the holder, an inner cartridge containing fluid material is inserted into the holder, a retaining ring must also be inserted into the holder to contain the inner cartridge within the holder (or the inner cartridge must be screwed into the holder), a pump mechanism must be attached to the cartridge, and then the cartridge must be sealed with a cap.

Prior to installation of the cartridge, the cartridge must first be filled with fluid material. Abbas is designed so that the cartridge is filled with fluid material and then temporarily sealed. The cartridge is then placed into the holder in its sealed form, and later punctured by the tip of the pump when it is desired to permit the free flow of fluid material into the applicator. This design is believed to prevent the pre-assembly of the cartridge into the holder when the cartridge is provided to a filling manufacturer because pre-assembly might cause premature puncturing of the cartridge. Moreover, the design of the cartridge typically requires additional screwing or the use of adhesives or the like to secure the cartridge within the holder. In this regard, it is believed that the Abbas dispenser cannot be sent to a filling manufacturer in a preassembled form, filled, and then simply sealed. Thus, the Abbas dispenser requires the steps of filling the cartridge, sealing the cartridge, and only then installing and securing the cartridge within the holder. The added step in the Abbas dispenser assembly process exemplifies the problems associated with the Abbas dispenser and prior art dispensers.

It is therefore beneficial to provide a dispenser assembly, such as those embodiments disclosed by the present invention, that is cheaper to manufacture, easy to assemble, maintains the integrity of the fluid material in the dispenser, and is compatible with pre-existing high speed filling machines.

BRIEF SUMMARY OF THE INVENTION

The present invention is designed to overcome the shortcomings associated with the disclosure of Abbas and other known fluid dispensers by providing a dispenser assembly that is cheaper to manufacture, requires few parts to assemble, and is readily compatible with standard high speed filling machines. As discussed more fully herein, the present invention requires few parts; namely, an end cap, a fluid insert containing fluid materials, and an outer casing. Unlike the prior art disclosures, each of these parts can be assembled together without the use of additional parts, such as adhesives or retaining rings, or steps such as screwing the different components together. The present invention further permits a manufacturer to sell a dispenser assembly to cosmetic companies and the like seeking to dispense their products (such as lotions, gels, etc.) into dispensers using a high speed filling process. The present invention is fully compatible with standard high speed filling apparatuses. The dispenser assembly can be provided to cosmetic companies and the like in an almost completely assembled manner and placed directly onto standard high speed filling apparatuses. The only assembly required after filling is the addition of a seal cap to seal the dispenser once the cartridge of the dispenser has been filled with the desired fluid material. In accordance with another important feature of the present invention, the capping process can also take place as part of the high speed filling process, further cutting down on the assembly time. The steps required to assemble the fluid dispenser greatly differs from known dispensers, which require the separate steps of filling the cartridge, sealing the cartridge, and then assembling the cartridge into the holder. The few steps required to assemble and fill the dispenser assembly according to the present invention increases production, while minimizing overall costs. Accordingly, various dispenser assemblies in accordance with the present invention are disclosed which achieves each of these shortcomings.

According to one aspect of the present invention, there is provided an instrument for applying a predetermined amount of fluid material to a surface comprising a fluid insert and an outer casing. The fluid insert has a first end and a second end, and a protruding ridge arranged on an exterior of the fluid insert between the first end and the second end. The outer casing has a hollow interior for receiving the fluid insert therein, a first end and a second end, and a pump actuating surface. The outer casing further includes an applicator tip integrally formed with the outer casing at the first end for dispensing fluid material from the outer casing, and an interior ridge arranged within the hollow interior between the first end and the second end for securing the fluid insert within the outer casing when the protruding ridge of the fluid insert is positioned between the interior ridge of the outer casing and the first end of the outer casing. There is also a pump arranged at the first end of the fluid insert that has a pump body and a pump tip. The fluid insert is constructed and arranged to be movable within the outer casing between a stationary position and an actuated position, wherein the pump is in an extended position when the fluid insert is in the stationary position, and the pump is in a retracted position within the pump body when the pump tip is in engagement with the pump actuating surface of the outer casing when the fluid insert is in the actuated position. The pump is operative to dispense a predetermined amount of fluid material as the fluid insert is moved from the stationary position to the actuated position within the outer casing.

According to another aspect of the present invention, there is provided an instrument for applying a predetermined amount of fluid material to a surface comprising a fluid insert for storing fluid material, a pump, and an outer casing. The fluid insert has a first end, a second end, and a notch arranged between the first end and the second end. The pump is arranged at the first end of the fluid insert and has a pump body, and a pump tip. The outer casing has a first end and a second end, a tab arranged between the first end and the second end, and an applicator for applying fluid material dispensed into the outer casing. The outer casing is constructed and arranged to receive the fluid insert so as to permit movement of the fluid insert within the outer casing between a first position and a second position. The tab is constructed and arranged to fit within the notch on the fluid insert so as to guide movement of the fluid insert when the fluid insert moves within the outer casing from the first position to the second position. The fluid insert is in the first position when the pump tip is in a fully extended position, and the fluid insert is in the second position when the pump tip is retracted into the pump body. The pump is operative to dispense fluid material into the outer casing when the fluid insert is moved from the first position to the second position.

In accordance with another aspect of the present invention, there is provided an instrument for applying a predetermined amount of fluid material that has a fluid viscosity ranging from 1000 centipoise (cps)-10,000 cps to a surface. The instrument comprises a fluid insert for storing fluid material, and an outer casing. The fluid insert has a first end and a second end, and a notch arranged on the fluid insert displaced from the first end of the fluid insert. It has a pump capable of pumping fluid material that has a fluid viscosity ranging from 1000 centipoise (cps)-10,000 cps. The pump is arranged at the first end of the fluid insert, and has a pump body and a pump tip. The pump is operative to dispense fluid material in response to movement of the pump tip. The outer casing has a first end and a second end, a tab arranged on the interior thereof, and an applicator for dispensing the fluid from the pump of the fluid insert within the outer casing. Tab constructed and arranged to fit within the notch so as to guide movement of the fluid insert within the outer casing.

In accordance with still another aspect of the present invention, there is provided a device for dispensing a predetermined amount of fluid material to a surface comprising an outer casing and a fluid insert for housing fluid material. The outer casing has first and second ends, an applicator at the first end, a first ridge arranged on an interior of the outer casing and displaced from the second end, and a second ridge arranged within the interior of the outer casing between the inner ridge and the applicator. The fluid insert has a raised band on the surface thereof, the fluid insert being constructed and arranged to fit within the outer casing so that the raised band is arranged between the first and second ridges of the outer casing. The fluid insert is movable from a first position to a second position within the outer casing to disperse fluid material. The fluid insert is in a first position when the raised band is adjacent to the first ridge of the fluid insert, and the fluid insert is in a second position when the raised band is adjacent to the second ridge of the fluid insert. The fluid insert dispenses a predetermined amount of the fluid material contained in the fluid insert through the applicator of the outer casing when the fluid insert moves from the first position to the second position.

In accordance with yet another aspect of the present invention, there is provided an instrument for dispensing a predetermined amount of fluid material comprising an outer casing and a fluid insert. The outer casing has an interior chamber, a first tab and a second tab arranged within the interior chamber, and an applicator integrally formed with the outer casing. The fluid insert is arranged and constructed to fit within the outer casing, and has a first notch and a second notch, a pump with an internal check valve, and a stop having a first side and a second side. The fluid insert is rotatable within the outer casing between a first position and a second position. The fluid insert is in the second position when the second side of the stop is adjacent to the second tab and the second notch is displaced from the second tab. The fluid insert is in the first position when the first tab is aligned with the first notch, and the first side of the stop is adjacent to the first tab. The dispenser assembly is adapted to dispense a predetermined amount of the fluid material from the fluid insert through the applicator when the fluid insert is in the first position.

In accordance with another aspect of the present invention, there is provided a dispenser assembly for dispensing a predetermined amount of fluid material comprising a fluid insert and an outer casing. The fluid insert has a body including a first end and a second end, a hollow chamber for storing a fluid material, a seal cap mounted to the first end for sealing the fluid insert, a pump connected to the second end for dispensing a predetermined amount of fluid material, a notch on the body displaced from the second end, and a protruding ridge displaced from the first end. The outer casing has an interior chamber for receiving the fluid insert and a first end and a second end. The applicator is arranged at the first end for applying the fluid material dispensed from the pump of the fluid insert to a surface. There is at least one tab arranged within the interior chamber of the outer casing and it is constructed and arranged to fit within the notch so as to guide movement of the fluid insert within the outer casing. The outer casing also has a ridge arranged within the interior chamber of the outer casing that is operative to restrict removal of the fluid insert when the fluid insert is assembled within the interior chamber.

In accordance with a further aspect of the present invention, there is provided a method of filling a dispenser assembly using a high speed filling apparatus. First, a pre-assembled dispenser assembly is provided that has an end cap, an outer casing, and an inner fluid receiving body. The outer casing has a first end and a second end, and an applicator at the first end. The inner fluid receiving body has a first end and a second end, a pump arranged at the first end of the inner fluid receiving body, and an opening arranged at the second end of the inner fluid receiving body. The inner fluid receiving body is pre-assembled in the outer casing so that the inner fluid receiving body closes the second end of the outer casing, and the end cap is arranged over the applicator of the outer casing. Second, the pre-assembled dispenser assembly is placed directly onto a filling apparatus. Third, the inner fluid receiving body is filled with a fluid material through the opening of the inner fluid receiving body. Fourth, the inner fluid receiving body of the partially pre-assembled dispenser assembly is sealed with a seal plug so as to provide a fully assembled and filled dispenser assembly.

These and other features and characteristics of the present invention will be apparent from the following detailed description of preferred embodiments, which should be read in light of the accompanying drawings in which corresponding reference numbers refer to corresponding parts throughout the several views.

BRIEF DESCRIPTION OF THE DRAWINGS

FIG. 14 is a top view of the seal plug of the fluid insert shown in FIG. 12.

FIG. 15 is a cross-sectional view of the seal plug shown in FIG. 14.

FIG. 16 is an exploded cross-sectional view of the ridges shown on the seal plug shown in FIG. 15.

DETAILED DESCRIPTION

In describing the preferred embodiments of the subject matter illustrated and to be described with respect to the drawings, specific terminology will be resorted to for the sake of clarity. However, the invention is not intended to be limited to the specific terms so selected and it is to be understood that each specific term includes all technical equivalents which operate in a similar manner to accomplish a similar purpose.

Figure 1:
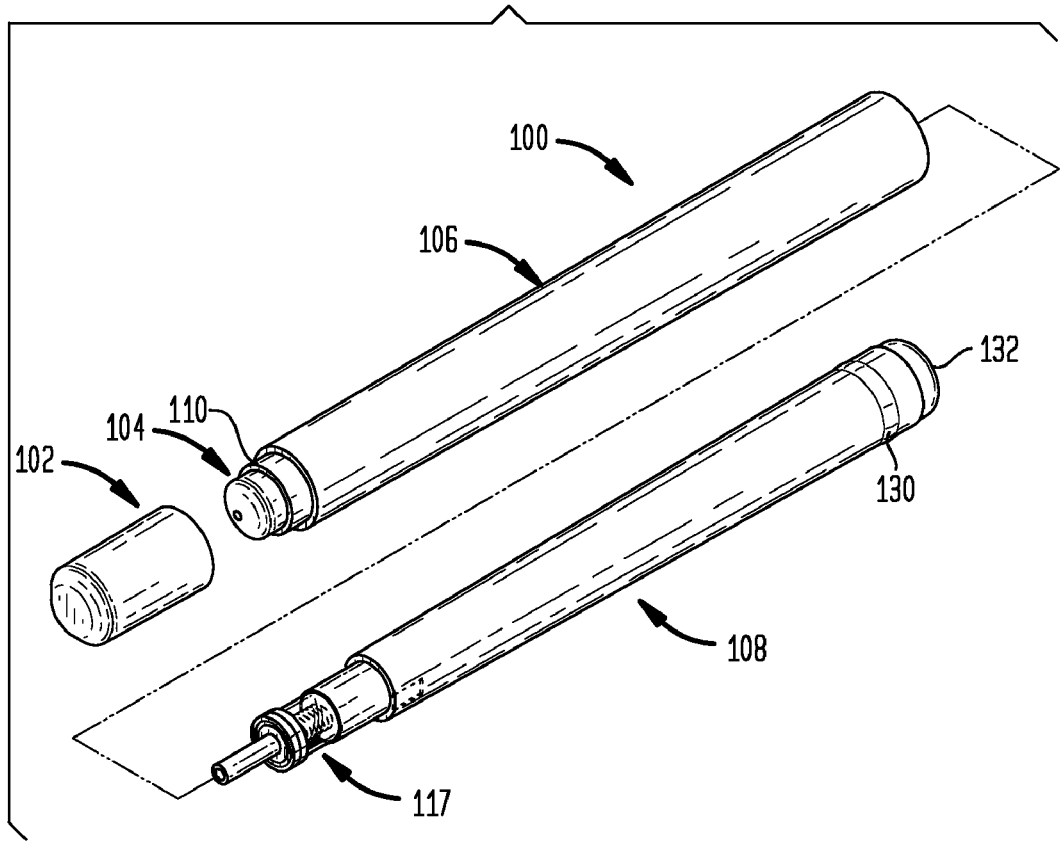
FIG. 1 is a perspective view of an unassembled cap, outer casing, and fluid insert according to an embodiment of the present invention.

The present invention is generally directed to a dispenser assembly 100 shown in FIG. 1 for dispensing predetermined amounts of fluid materials. The material, such as lotion, is stored within a fluid insert 108 and dispensed therefrom in response to pressure applied by a user onto the fluid insert 108, which, in turn, actuates the pump 117. The dispenser also contains an outer casing 106 that holds the fluid insert 108.

It is to be understood that the dispenser for fluid materials of the present invention may be utilized to dispense various liquids, pastes, semi-liquids, semi-solids, gels, and the like. Such materials are preferably derived from the cosmetics industry and may include gels, medicated creams and lotions, and the like to be dispensed using the dispenser of the present invention. Also for convenience, all such materials will be generally referred to as fluid materials, although they may have semi-solid, paste-like or other consistencies.

Figure 2:
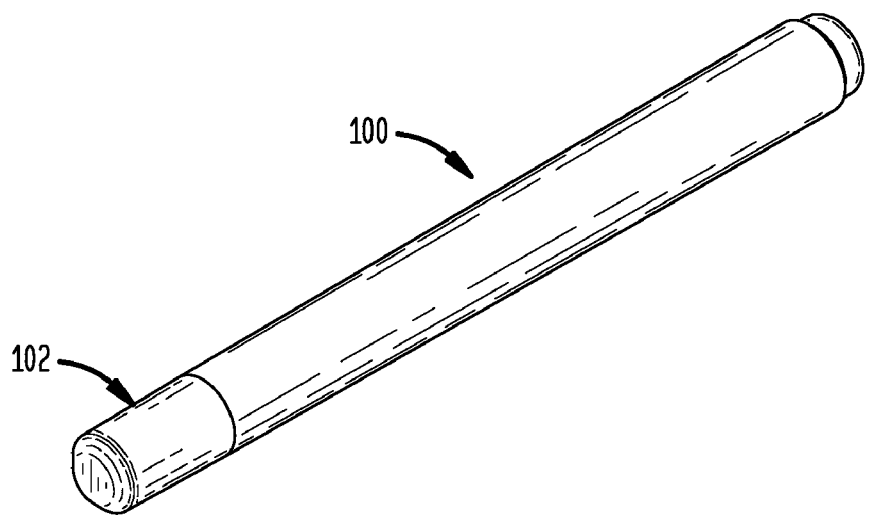
FIG. 2 is a perspective view of an assembled cap, outer casing, and fluid insert of the dispenser assembly shown in FIG. 1.

Referring to FIG. 1, the dispenser assembly 100 is preferably comprised of a dispenser cap 102, an outer casing 106, and a fluid insert 108. The dispenser assembly 100 is constructed and arranged so that the fluid insert 108 is disposed and secured within the outer casing 106, and the dispenser cap 102 fits over the outer casing 106. The dispenser cap protects the applicator 104 from being contaminated or otherwise damaged. As shown in FIG. 2, when these components are assembled together, they form an elongated cylindrical dispenser assembly that is preferably in the shape of a tubular pen, although the dispenser may take on a variety of alternate shapes, such as animals, flowers, or any desired shape.

Figure 3:
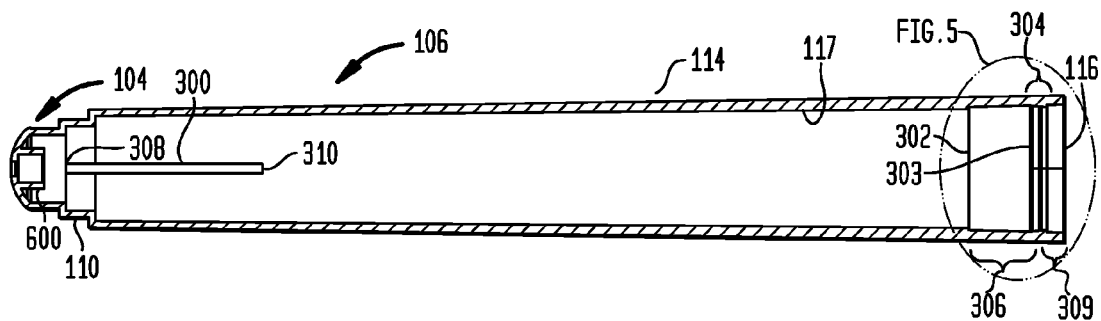
FIG. 3 is a cross-sectional view of the outer casing shown in FIG. 1.
Figure 4:
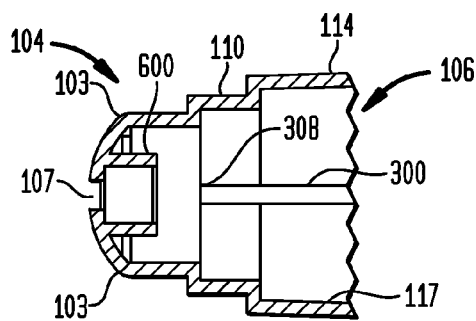
FIG. 4 is an exploded cross-sectional view of the left end of the outer casing shown in FIG. 3.

Referring to FIGS. 3 and 4, the outer casing 106 is preferably a hollow tube with an elongated outer body 114 having an applicator 104, and a connector portion 110 that connects the applicator 104 to the outer body 114. The outer body 114 preferably has a larger diameter than the applicator 104 and connector 110. In this regard, the connector portion 110 preferably has a diameter greater in size than the applicator 104, but smaller than the outer body 114. The connector 110 and applicator 104 are both preferably integrally formed with the outer body 114 so as to minimize the number of parts needed to manufacture and assemble the outer casing 106, as well as to decrease the overall costs associated with the manufacture and assembly of the dispenser assembly 100. It should be appreciated, however, that the outer casing 106 may be formed from separate components that are assembled together, and that the connector portion 110 may be removed.

Figure 6:
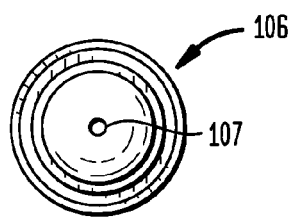
FIG. 6 is a front view of the left end of the outer casing shown in FIG. 3.
Figure 7:
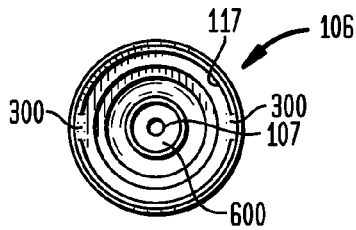
FIG. 7 is a rear view of the right end of the outer casing shown in FIG. 3.

The applicator 104 preferably has rounded ends 103 and an opening 107 (see also FIG. 6) through which the fluid material from the fluid insert 108 (see FIG. 1) is dispersed. As shown in FIGS. 3, 4, and 7, a raised wall 600 arranged on the interior side 117 of the applicator 104 surrounds the opening 107. The wall 600 helps guide the tip 120 (see FIG. 1) of the fluid insert 108 into the opening 107 when the fluid material is dispensed from the fluid insert 108. It should be appreciated that the applicator can also take on a variety of alternate constructions such as a spray device, brush, roller, scrubbing pad, and the like.

Figure 5:
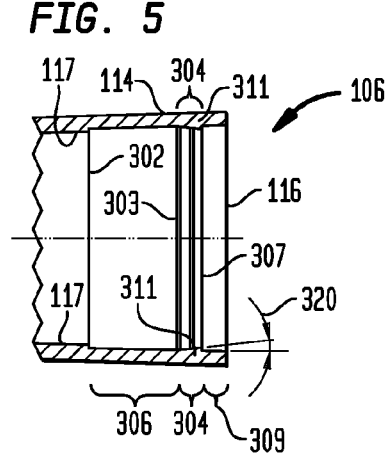
FIG. 5 is an exploded cross-sectional view of the right end of the outer casing shown in FIG. 3.

Referring to FIGS. 3 and 5, an edge 302 and protruding inner casing ridge 304 is arranged towards the open end 116 of the interior 117 of the outer casing 106. In a preferred embodiment, one inner casing ridge 304 is located along the perimeter of the interior 117 of the outer casing 106, although it should be appreciated that more than one ridge may be used. The edge 302 and innermost edge 303 of the inner casing ridge 304 define the boundaries of a pumping region 306 which, as best shown in FIG. 5, has a diameter that is slightly larger than the diameter of the remainder of the interior 117. In a preferred embodiment, the diameter of the pumping region 306 will differ from that of the remainder of the outer body 114 on the order of 0.012±0.003 inches. A similar outer region 309 preferably having a reduced diameter extends from the outermost edge 307 of the inner casing ridge 304 to the open end 116 of the outer casing 106.

Referring to FIG. 5, the diameter of the area in which the protruding inner casing ridge 304 is located preferably decreases so as to eventually equal the diameter of the pumping region 306. In the embodiment shown, there is an angular slope 320 that slopes at an angle of 10° from the highest point 311 of the inner casing ridge 304 to the pumping region 306. It should be appreciated that the size and slope of the ridge may be increased or decreased.

As shown in FIGS. 3, 4, and 7, tabs 300 are arranged on opposed surfaces at the front end of the interior 117 of the outer casing 106. The tabs 300 are elongated and have a first end 308 located at the beginning of the connector portion 110 and a second end 310 located towards the lower end of the body 114. As will be discussed fully herein, the tabs are designed to help guide the movement of the fluid insert 108 when the dispenser assembly 100 is actuated so as to dispense fluid material. The size of the tabs may therefore vary based upon the size of the fluid insert 108 and/or the travel length of the fluid insert 108 when it moves from a stationary position to an actuated pumping position. Accordingly, the length of the tabs 300 may be altered to suit the desired movement of the dispenser assembly 100.

Figure 8:
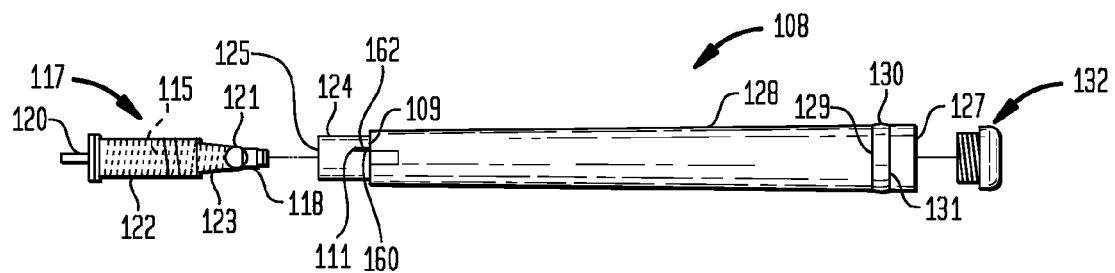
FIG. 8 is a perspective view of an unassembled inner casing shown in FIG. 1.
Figure 9:
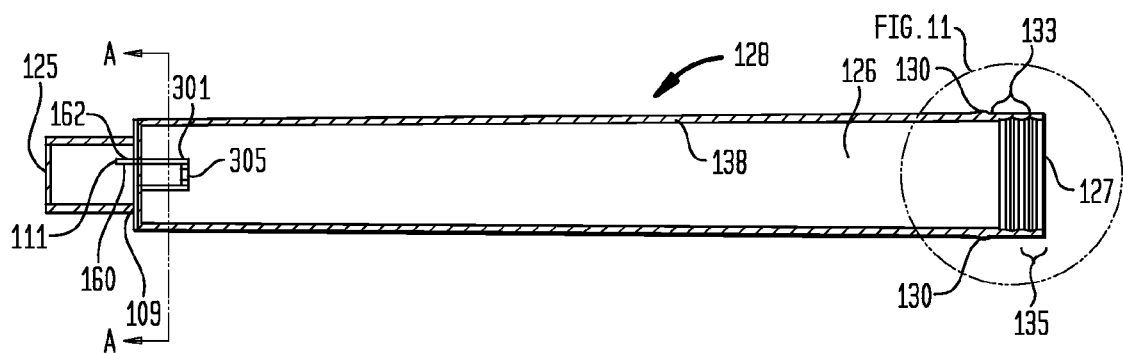
FIG. 9 is a cross-sectional view of the body of the fluid insert shown in FIG. 8.

Referring to FIG. 8, the components of the fluid insert 108 according to an embodiment of the present invention are shown. The fluid insert 108 is adapted to contain the fluid material to be dispensed within its interior chamber 126. The fluid insert 108 is comprised of a pump 117, a seal plug 132, a fluid insert body 128, having a first end 125, a second end 127, a transition region 124, and a fluid insert band 130 arranged near the second end 127 of the fluid insert 108. As shown in FIG. 9, the fluid insert body 128 is preferably tapered in shape, the diameter of the fluid insert 108 decreasing in size from its second end 127 to the first end 125. The fluid insert 108 must have an overall diameter that is small enough to fit within and be capable of axially moving within the outer casing 106 (see FIG. 3). Preferably, the fluid insert is at least 0.0035±0.0015 inches smaller than the outer casing.

Figure 10:
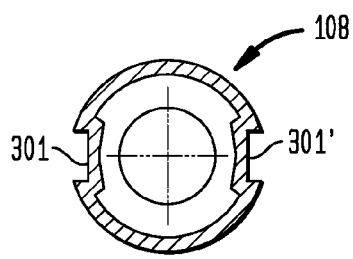
FIG. 10 is a cross-sectional view of section A-A shown in FIG. 9.

As shown in FIGS. 9 and 10, a first notch 301 is arranged on the exterior of the fluid insert body 128 and a second notch 301' is arranged on the opposed exterior side of the fluid insert body 128. The notches 301, 301' are recessed so that they can receive the tabs 300 of the outer casing 106 (see FIG. 3) when the dispenser assembly 100 is fully assembled. The notch edge 305 of the notch 301 also creates a stop when the tab 300 (see FIG. 3) of the outer casing 106 is inserted into the notch 301.

Figure 11:
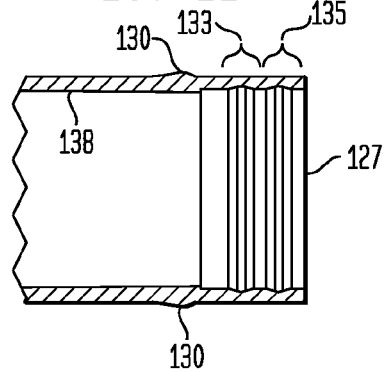
FIG. 11 is an exploded cross-sectional view of the right side of the fluid insert body shown in FIG. 9.

As shown in FIGS. 9 and 11, there are preferably two ridges 133, 135 arranged near the second end 127 of the fluid insert body 128. The fluid insert ridges 133, 135 are arranged along the inner perimeter of the interior 138 of the fluid insert body 128. In the embodiment shown, there are two ridges shown, however, it should be appreciated that any number of ridges may be utilized, and only one ridge is required.

As shown in FIG. 11, the fluid insert ridges 133, 135 have diameters greater than the remainder of the interior 138 of the fluid insert 108. Preferably, the diameters of the fluid insert ridges 133, 135 are 0.0125±0.0015 inches greater than the diameter of the remainder of the interior 138, although the fluid insert ridges 133, 135 may differ based on any desired measurements. As will be discussed more fully herein, the fluid insert ridges 133, 135 can receive a complementary seal plug ridge 136 (see FIG. 8) from the seal plug 132 to secure the seal plug 132 within the fluid insert 108.

Referring to FIGS. 8, 14, and 15 the seal plug 132 is circular in shape with rounded edges 134 and an inner wall 137. The seal plug 132 is used to seal the fluid insert 108 so as to prevent fluid from leaking out of the fluid insert 108, or contamination of the fluid material stored in the fluid insert 108. As best shown in FIG. 15, an inner wall 137 is recessed away from the edge 142 of the seal plug 132 and engages the interior chamber 126 (see FIGS. 8, 9) of the fluid insert 108. As shown in FIGS. 15-16, the seal plug 132 has two seal plug ridges 136 that are raised and have a height greater than the remainder of the inner walls 137. The outer end 140 of the seal plug 132 preferably has an indentation 145 that makes it easier for users to apply force to the fluid insert 108 when it is desired to dispense fluid material form the fluid dispenser assembly 100.

In order to connect the seal plug 132 to the fluid insert body 128, each of the seal plug ridges 136 engage the fluid insert ridges 133, 135 arranged on the interior 138 of the fluid insert body 128. (See FIGS. 9 and 11.) The resistance created by the fluid insert ridges 133, 135 and seal plug ridges 136, permits the seal plug 132 to securely snap into place within the fluid insert body 128. The seal plug 132 is secured within the fluid insert body 128 once the seal plug ridges 136 are locked into position within the fluid insert ridges 133, 135. Additional adhesives or the like may be used to further secure the seal plug 132 in the fluid insert body 128, although it is not necessary.

Figure 17:
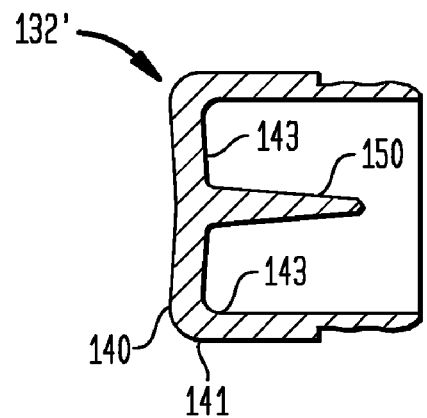
FIG. 17 is a cross-sectional view of the seal cap according to an alternative embodiment of the present invention.
Figure 18:
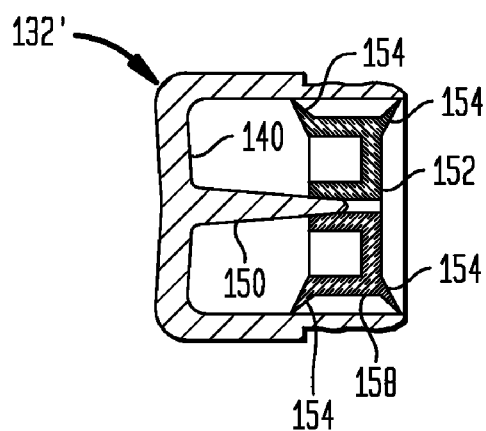
FIG. 18 is a cross-sectional view of a seal cap and diaphragm according to an embodiment of the present invention.
Figure 19:
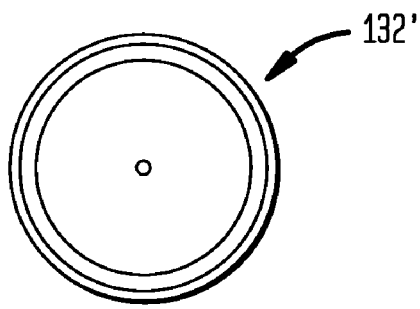
FIG. 19 is a top view of the diaphragm shown in FIG. 18.

Referring to FIGS. 17-19, an alternative embodiment of a seal plug 132' is shown. The seal plug 132' is substantially similar to the seal plug shown in FIGS. 14-16, however the alternative seal plug 132' has a diaphragm holder 150 that is in the shape of an elongated triangle. The base of the diaphragm holder 150 is attached to the interior 143 of the seal plug 132'.

Diaphragm 152 is designed to fit within the interior of the seal plug 132'. The diaphragm 152 is circular in shape and its center rests upon the center 156 of the diaphragm holder 150. It is not securely fastened to the diaphragm holder 150 and is held in place by the fluid material contained in the interior chamber 126 of the fluid insert 108 (See FIG. 9.) The diaphragm 152 also has scrapers 154 which extend from the main body 158 of the diaphragm 152. When the fluid insert 108 withdraws fluid material from the interior chamber 126, the weight of the diaphragm 152 aids in pushing the fluid material towards the pump 117, while also scraping the walls of the interior chamber 126, as the diaphragm moves closer to the pump 117.

Due to the taper of the fluid insert 108, the diaphragm 152 is preferably slightly smaller than the seal plug 132 so that it can extend down the length of the fluid insert body. It is also preferably comprised of a Low Density Polyethylene (commonly referred to as LDPE) material, which is very thin and flexible and permits the diaphragm 152 to give and flex as it slides down the fluid insert body 128. The diaphragm may also be constructed and arranged to match the taper of the fluid insert 108. It should be appreciated that any type of diaphragm may be used to scrape fluid materials from the sides of the interior of the fluid insert.

Figure 12:
FIG. 12 is a cross-sectional view of the assembled fluid insert body, pump, and seal cap of the fluid insert shown in FIG. 1.

Referring back to FIG. 8, the pump 117 is a standard pump with an internal check valve, that is preferably capable of dispensing fluid materials of high viscosity, such as those known in the art. For example, an EMSAR Pump, PAV (A45) series having a 130 mcl micro liter output may be utilized. In a preferred embodiment, the pump is capable of pumping fluids having a fluid viscosity ranging from of at least 1000 cps to 10,000 cps, although a pump capable of pumping fluids having a much lower or much higher viscosity is also contemplated. The body of the pump 117 preferably has three tapered regions, a main pump body 122, an intermediate pump body 123, and an intake region 118, respectively decreasing in size and length. The pump 117 preferably has an internal ball check valve 121 to regulate the amount of air permitted to enter into the interior chamber 126 of the fluid insert 108. As shown in FIG. 12, when the pump 117 is assembled into the fluid insert body 128 of the fluid insert body 128, the pump 117 is only partially arranged within the fluid insert body 128. The intake region 118 and intermediate body 123 of the pump 117 are located within the fluid insert body 128. A portion of the main pump body 122 is located within the transition region 124, while the remaining portion of the main pump body 122, as well as the tip 120, protrude from the fluid insert body 128.

The shapes and sizes of the transition region 124 of the fluid insert body 128 and main pump body 122 of the pump 117 are complementary to one another so that the pump 117 can securely fit into the transition region 124 of the fluid insert body 128. The taper of the main pump body 122 prevents the pump 117 from completely entering the interior of the fluid insert body 128, while permitting for a secure fit within the fluid insert body 128. The main pump body 122 also rests against the transition region edge 113 to prevent the pump 117 from further advancing into the fluid insert body 128.

Adhesives or the like may be applied to the pump 117 and transition region 124 so as to provide additional security for the pump 117 to remain within the intermediate body 123 of the fluid insert 108. However, due to the secure fit of the pump 117 within the fluid insert body 128, additional adhesives are not necessary. It should be appreciated that the shapes and sizes of the complementary parts provide a cost effective means for securely fastening the parts of the fluid insert 108 together.

The dosage of fluid desired to be dispensed from the dispenser assembly 100 will determine the size of the pump incorporated into the dispenser assembly 100. For example, if it is desired to dispense 100 mcl of a fluid product, a standard pump capable of dispensing 100 mcl of a fluid product can be purchased for use in the dispenser assembly 100 of the present invention. Similarly, if it is desired to dispense 200 mcl of fluid product, a standard pump capable of dispensing 200 mcl of fluid can be utilized in the dispenser assembly 100. The dimensions of the dispenser assembly 100 may need to be adjusted to fit the differing sizes of pumps desired. In the embodiment shown, a 130 mcl pump is used, and the size of the fluid insert body 128 and transition region 124 are complimentary to the pump configuration.

When it is desired to assemble the components of the dispenser assembly 100, the assembled fluid insert 108 (FIG. 1) is inserted into the outer casing 106 (FIG. 1). The fluid insert 108 is secured in the outer casing 106 when the band 130 (see FIG. 8) located on the exterior side of the fluid insert 108 is located in the pumping region 306 of the outer casing 106. When the fluid insert 108 is inserted into the outer casing 106, the band 130 must pass through the inner casing ridge 304 of the outer casing 106 and into the pumping region 306.

Figure 13:
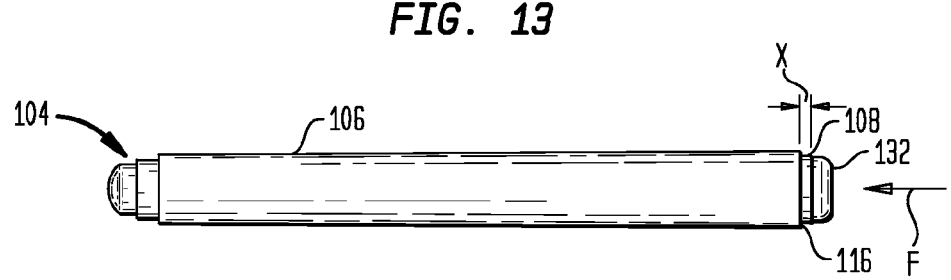
FIG. 13 is a front view of the assembled fluid insert and outer casing shown in FIG. 1.

Referring to FIG. 13, when the dispenser assembly 100 is in a stationary position, the fluid insert 108 will sit within the outer casing 106, allowing a portion X and the seal cap 132 of the fluid insert 108 to protrude beyond the open end 116 of the outer casing 106. The outermost edge 131 of the band 130 (see FIG. 8) will rest against the innermost edge 303 of the inner casing ridge 304 (see FIG. 3). In this stationary position, there is a distance X from the seal cap 132 to the edge 116 of the outer casing 106.

As shown in FIG. 13, when it is desired to dispense fluid from the dispenser assembly 100, a Force F is applied to the end 132 of the fluid insert 108. Due to the reduced diameter of the pumping region 306, (see FIGS. 3 and 5) the fluid insert 108 is able to move a short distance within the outer casing 106. The movement of the fluid insert 108 forces retraction of the springs 115 into the pump 117, so that, the tip 120 of the pump 117 is able to retract into the pump 107. When the tip is retracted into the pump 107, fluid material is withdrawn from the fluid material contained in the pump 107 and expelled through the opening 107 of the outer casing 106. In its retracted position, the seal plug 132 abuts the outer edge 116 of the outer casing 106, thereby eliminating the distance X present when the fluid dispenser 100 is in a stationary position. When the Force F is released, the fluid insert 108 will return to its fully extended position because the Force F that is transferred to the springs 115 is also released. This simultaneously causes the pump 117 to withdraw fluid material from the interior chamber 126 of the fluid insert body 128, and store it in the pump 117 until another Force F is applied. It should be noted that although a user may continue to apply a Force F to the fluid insert 108, no additional fluid material will be dispensed until the Force F is released, and a new Force F is applied. In this way, only predetermined amounts of fluid materials are dispensed at any one given time. When the fluid insert 108 is in its actuated or retracted position, the innermost end 129 (See FIG. 8) of the band 130 abuts the edge 302 (See FIG. 3) of the outer casing 106. The notches 301 (See FIG. 9) will move along the tabs 300 (See FIG. 3) and the tip 120 of the pump 117 will be guided by the walls 600 (See FIG. 7) located on the interior 117 of the outer casing 106. In this position, the tip 120 of the pump 118 is partially arranged within the pump 120, and the distance X that is visible when the fluid insert sits in its stationary position (see FIG. 13) within the outer casing 106 is no longer visible.

Figure 20:
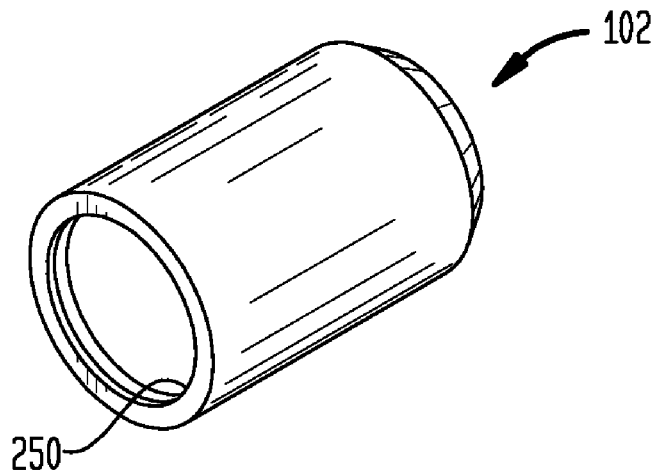
FIG. 20 is a perspective view of the end cap shown in FIG. 1.
Figure 21:
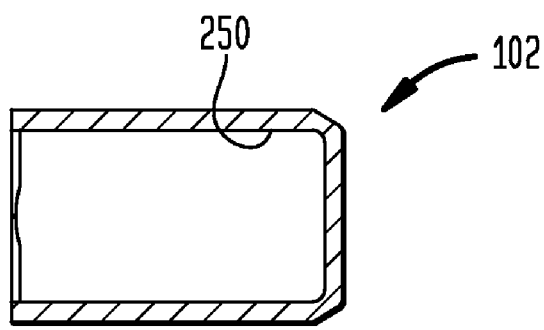
FIG. 21 is a cross-sectional view of the end cap shown in FIG. 20.

Referring to FIGS. 20-21, the end cap 102 is shown. The end cap 102 helps to prevent fluid material contained within the fluid insert 108 from spoiling because it provides an additional outer seal to keep the fluid material fresh. The end cap 102 is circular in shape and designed to fit over the applicator 104 and connector 110 of the outer casing 106. (See FIG. 1.) The inner walls 250 of the end cap 102 fit snugly over the connector 110 of the outer casing 106. Due to the minimal differences between the diameter of the end cap 102 and the diameter of the connector 110, the end cap 102 can be securely positioned over the outer casing 106 so as to remain in place until it is desired to remove the end cap 102 from the outer casing 106.

Figure 22:
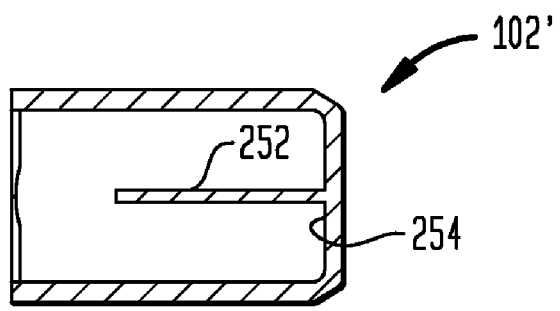
FIG. 22 is a cross-sectional view of an end cap according to an alternative embodiment of the present invention.

As shown in FIG. 22, an alternative embodiment of the end cap 102' is shown. A declogger 252 is arranged at the center of the interior 250' of the base 254' of the end cap 102'. The declogger 252 is preferably in the shape of a cylinder that will fit within the opening 107' of the outer casing 106', but any shape of declogger that will fit within the opening 107 of the outer casing 106 will suffice. Placement of the declogger 252 within the end cap 102' helps to prevent any clogging that may occur from fluid materials that dry and clog the opening 107 of the applicator 104.

An important feature of the present invention concerns the ability of the dispenser assembly 100 to be moved from a locked position to an unlocked position in order to avoid accidental discharge of the fluid material contained in the fluid insert 108. The lock and unlock feature preferably operates by allowing the fluid insert 108 to rotate between a locked and unlocked position. When the dispenser assembly 100 is in an unlocked position, the dispenser assembly 100 is able to discharge fluids through the opening 107 of the outer casing 106. This occurs when the tabs 300 located on the outer casing 106 are aligned with the notches 301 of the fluid insert 108, so that the tabs 300 slide within the notches 301. The first side 160 (see FIGS. 8-9) of the stop 111 will also be adjacent to the tab 300 (see FIG. 7). The stop 111 will prevent any additional rotation of the fluid insert 108 in the direction of the first side 160 of the stop 111, to notify a user that the fluid insert 108 cannot be further rotated in that direction. As shown in FIG. 14, directional arrows can be placed on the top of the seal plug 32 of the fluid insert to further provide visual instructions for the user to place the seal plug 132 into an open position. When the fluid insert 108 is rotated in the opposite direction, the fluid insert 108 moves from the unlocked position to a locked position. In this position, the tab 300 and notch 301 do not align. The tabs 300 will instead contact the inner casing outer edge 109 (See FIGS. 8-9), thereby preventing the fluid insert 108 from moving within the pumping region 306 of the outer casing 106. The fluid insert 108 can only be rotated until the second side 109 of the stop 111 (see FIGS. 8-9) is adjacent the notch 300'. Thus, the fluid insert 108 is in a locked position whenever stop 11 of the fluid insert 108 is located between the notch 300 and notch 300'. In this locked position, fluid materials are unable to accidentally discharge from the fluid dispenser 100.

Due to the location of the tabs 300 and notches 301 on opposed sides of the outer casing 106 and fluid insert 108, the fluid insert 108 moves from a closed position to an open position whenever the fluid insert 108 is rotated 180°. It should be appreciated, however, that the number of tabs and corresponding notches will determine the amount of rotation necessary to move the fluid insert 108 from a locked position to an unlocked position.

The fluid dispenser assembly 100 according to the embodiments described herein is cost effective for the manufacturer, as well as the company desiring to purchase dispensers that can be used to sell their fluid products, such as a cosmetic company. It is comprised of few parts that can be "snapped" into place due to the various shapes of the components. This eliminates the need for the added costs of adhesives and the like, or the additional step of "screwing parts" together. The manufacturer therefore has few parts to produce and assemble, allowing the manufacturer to significantly cut production and materials costs.

Due to the design of the dispenser assembly 100, the manufacturer can then provide the dispenser assembly 100 almost fully assembled to a purchasing company desiring to solicit their fluid materials in a particular dispenser. The pump 107 and fluid insert body 108 can be preassembled into the outer casing 106, and the end cap 102 can be placed over the applicator 104 of the outer casing 106. The only part not assembled at that time is the seal plug 132, which as discussed herein, is assembled after the filling process.

The assembled parts of the dispenser assembly 100 are then placed onto a standard filling apparatus, making them immediately available for filling. The simple cylindrical shape of the applicator and the fact that there are no additional obstructions protruding from the dispenser assembly 100, make the dispenser assembly 100 fully compatible with standard industrial filling machines. For example, the fluid dispenser 100 is fully compatible with a standard filling apparatus such as the NORDENMATIC 3003/5002 line, that is capable of filling 300-500 tubes per minute. The compatibility between the dispenser assembly 100 and a standard filling machine eliminates the need for purchasing additional parts to make the fluid dispenser compatible with the filing machine.

Once the dispenser assemblies are positioned on the filling machine, the filling machine will dispense fluid material from the filling machine into the open end 127 of the fluid insert body 128. Thereafter, the seal plug 132 can be snapped into the fluid insert by a standard capping machine, thereby fully completing the assembly of the fluid dispenser 100. The capping process may also take place as part of the high speed filling process. The compatibility of the dispenser assembly 100 with standard filling apparatuses, combined with the relative ease of sealing the dispenser assembly 100 after it has been filled, are just some of the advantages of this embodiment of the present invention over the prior art.

Figure 23:
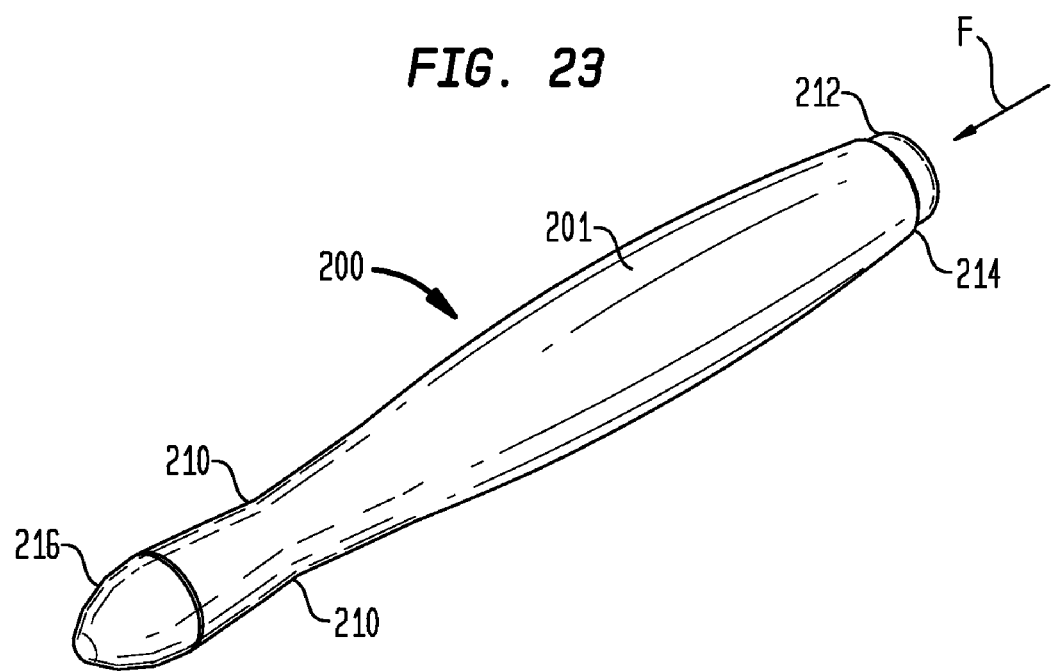
FIG. 23 is an alternative embodiment of the fluid dispenser assembly according to the present invention.

FIG. 23 shows an alternative embodiment of a fluid dispenser 200. The outer casing 201 is curved in shape, so as to provide grips 210 for a user to hold the fluid dispenser 200. The fluid insert 212 protrudes from the end 214 of the outer casing 200, and is identical to the fluid insert shown in FIG. 1. This alternative fluid dispenser 200 operates in substantially the same way as the fluid dispenser 100 previously discussed. A Force F is applied to the end of the fluid insert 212, which causes actuation of the pump (not shown) contained in the fluid insert 212. Fluid material is then dispersed from the fluid insert 212 to the opening (not shown) of the outer casing 201. To seal the fluid dispenser 200, a dispenser cap 216 fits over the outer casing 201 and prevents the fluid material contained in the fluid insert 212 from spoiling. It should be appreciated that the fluid insert 212 can consistently remain the same shape, while the outer casing 201 may take on any desired shape or form. This is advantageous for cosmetic companies and the like seeking to sell a customized dispenser.

Although the invention herein has been described with reference to particular embodiments and preferred dimensions or ranges of measurements, it is to be understood that these embodiments are merely illustrative of the principles and applications of the present invention. Additionally, it is to be appreciated that the present invention may take on various alternative orientations. It is therefore to be understood that numerous modifications may be made to the illustrative embodiments and that other arrangements may be devised without departing from the spirit and scope of the present invention as defined by the appended claims.

The invention claimed is:

1. A dispenser assembly for dispensing a predetermined amount of fluid material comprising:
   a fluid insert having a body including a first end and a second end, a hollow chamber for storing a fluid material, a seal cap mounted to said first end for sealing said fluid insert, a pump connected to said second end for dispensing a predetermined amount of fluid material, a first notch and a second notch on said body displaced from said second end, a protruding ridge displaced from said first end, and a stop having a first side and a second side; and
   an outer casing having an interior chamber for receiving said fluid insert, said outer casing having a first end and a second end, an applicator arranged at said first end for applying said fluid material dispensed from said pump of said fluid insert to a surface, a first tab arranged within said interior chamber of said outer casing, a second tab arranged within said interior chamber of said outer casing, said first tab constructed and arranged to fit within said first notch and said second tab constructed and arranged to fit within said second notch, said first and second tabs guiding movement of said fluid insert within said outer casing, a ridge arranged within said interior chamber of said outer casing, said ridge being operative to restrict removal of said fluid insert when said fluid insert is assembled within said interior chamber,
   wherein said fluid insert is rotatable within said outer casing between a pumping position and a non-pumping position, said fluid insert being in a non-pumping position when said second side of said stop is adjacent to said second tab and said second notch is displaced from said second tab, and said fluid insert is in said first position when said first tab is aligned with said first notch and said first side of said stop is adjacent to said first tab.

2. The device of claim 1, wherein the second end of the fluid insert extends beyond the second receiving end of the outer casing.

3. The device of claim 1, wherein the fluid insert further includes a raised band extending around an outer surface of the fluid insert, the raised band capable of being moved within the pumping region during movement of the fluid insert from the first position to the second position.

4. The device of claim 1, further comprising a movable pushing mechanism positioned within the fluid insert, the pushing mechanism capable of moving the fluid material within the fluid insert toward the pump.

5. A device for dispensing a predetermined amount of a fluid material to a surface comprising:
   a hollow outer casing having a first applicator end and an opposed second receiving end, an interior surface, an opening at the first applicator end, and a pumping region positioned between the first applicator end and second applicator end;
   a fluid insert for housing fluid material, the fluid insert having a first end, a pump arranged at the first end of the fluid insert, and a raised band on the outer surface thereof, the fluid insert being constructed and arranged to fit within the hollow outer casing so that the raised band is arranged within the pumping region, the fluid insert capable of moving between the second receiving end and the first applicator end of the outer casing from a first position to a second position,
   wherein the fluid insert is in the first position when the raised band is closer to the second receiving end of the outer casing, and the fluid insert is in the second position when the raised band is closer to the first applicator end of the outer casing, the fluid insert dispensing a same predetermined amount of the fluid material contained in the fluid insert through the opening of the outer casing each time the fluid insert moves from the first position to the second position,
   wherein the pumping region has a diameter that is greater than a diameter of the remainder of the interior surface of the outer casing, the pumping region retaining the fluid insert within the outer casing.

6. The device of claim 5, wherein the pump further comprises a pump body and pump tip, and wherein movement of the fluid insert from the first position to the second position causes the pump tip to engage a pump actuation surface on the outer housing and eject the same predetermined amount of fluid material through the opening in the outer housing.

7. A dispenser assembly for dispensing a fluid, the dispenser assembly comprising:
- an elongate hollow outer casing having a first end with an aperture and a second end forming a receiving opening, the hollow outer casing including a pumping section defined by first and second stops;
- a fluid insert positioned predominantly within said hollow outer casing and accessible to a user through said receiving opening, the fluid insert including a pump at the first end of the hollow outer casing and a fluid reservoir associated therewith, the pump including a spring mechanism biased to move said fluid insert toward the receiving opening, the fluid insert including a band;
- wherein the band is forced against the second stop by the spring mechanism and against the first stop under external force applied to the fluid insert by a user, the pump disposing a same predetermined volume of fluid upon application of the external force each time the band travels from the second stop to the first stop.

8. The dispenser of claim 7, wherein the pump includes an intake region through which the pump is refilled with a volume of fluid from the fluid reservoir upon movement of said band from said first stop to said second stop.

9. The dispenser of claim 7, wherein said pumping section is of a greater diameter than a remainder of the fluid insert immediately adjacent, and said first and second stops are formed by a junction between the differing diameters.

10. The dispenser of claim 9, wherein the band is raised above adjacent portions of the fluid insert.

11. The dispenser of claim 7, wherein said pumping section is generally positioned near said receiving opening.

12. The dispenser of claim 7, wherein the external force compresses the spring mechanism.

* * * * *